United States Patent [19]

Goodrich

[11] Patent Number: 4,834,452
[45] Date of Patent: May 30, 1989

[54] SWIVEL SEAT AND FRAME

[76] Inventor: Grover G. Goodrich, 1809 W. Hively, Elkhart, Ind. 46517

[21] Appl. No.: 215,402

[22] Filed: Jul. 5, 1988

[51] Int. Cl.⁴ .............................................. A47C 15/00
[52] U.S. Cl. ..................................... 297/240; 297/314; 297/349
[58] Field of Search ............. 108/140, 142; 296/65 R, 296/69, 64; 297/240, 344, 349, 314

[56] References Cited

U.S. PATENT DOCUMENTS

| 2,290,464 | 7/1942 | Bucheit | 296/65 R |
| 2,587,679 | 3/1952 | Atkinson | 296/65 R |
| 3,113,804 | 12/1963 | Ritter | 108/140 X |

FOREIGN PATENT DOCUMENTS 540946  9/1955  Belgium ............................. 108/140

Primary Examiner—James T. McCall
Attorney, Agent, or Firm—Thomas J. Dodd

[57] ABSTRACT

A swivel seat and frame which includes a pair of individual seat frames secured to a base. At least one of the seat frame is slidably and rotatably attached to the base to allow the seat to be rotated 90° or more.

7 Claims, 5 Drawing Sheets

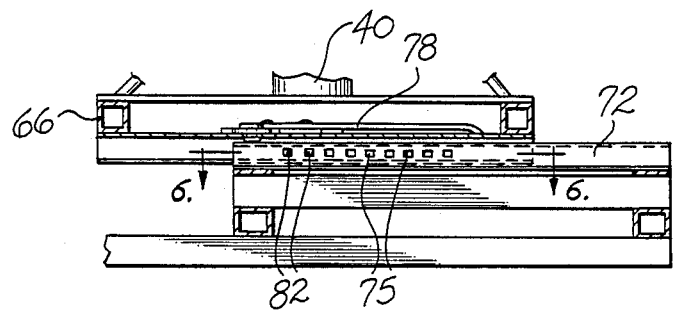
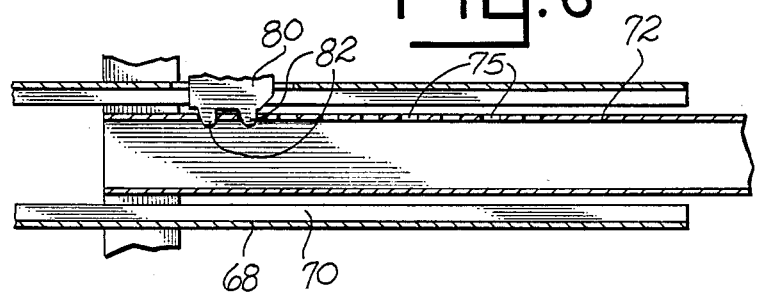
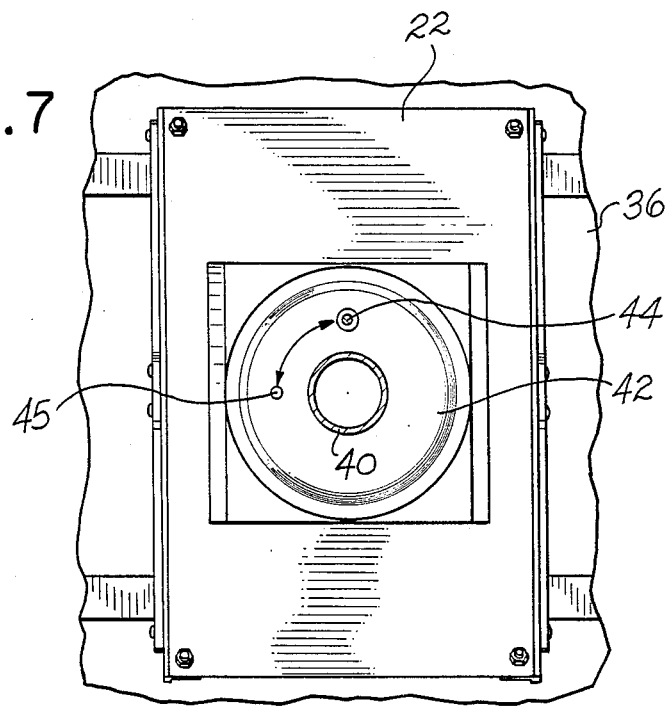

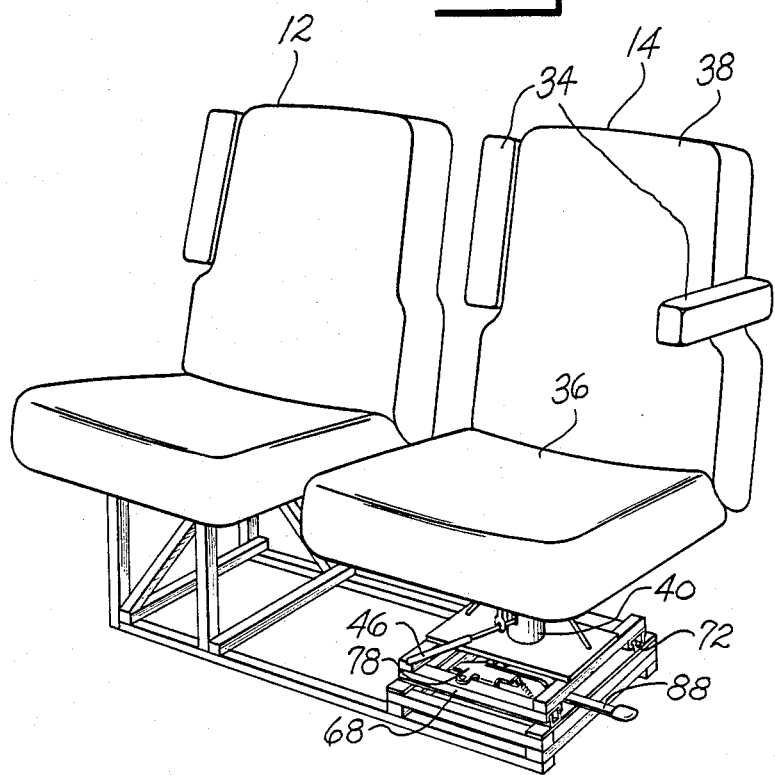

SWIVEL SEAT AND FRAME

SUMMARY OF THE INVENTION

This invention relates to a seat frame and will have application to dual seat frames in which at least one of the seats is rotatable relative to the other.

Optimum usage of interior space has always been of prime concern to designers of recreational vehicles and commercial aircraft. Particularly in the floor plan design of recreational vehicles, such as motor homes, travel trailers, fifth wheels, vans and boats, maximum functional usage of space can be critical if the designer is limited by size and price constraints in the marketplace. One of the current problems in the RV industry in the lack of adequate space for chairs to allow the inhabitants to relax after a meal and/or engage in conversation in comfort.

The seat frame of this invention is intended as an alternative to the conventional RV dinette seats which currently resemble a restaurant booth. The seat frame may also have use in the home or in commercial aircraft to allow for comfortable face-to-face conversation across a passage aisle. The seat frame includes two (or perhaps more) seat supports and back supports at least one of which is slidably and rotatably connected to the frame. This connection allows one seat to be slid away from the other seat, rotated 90° (or more) into a desired position, and then slid back into the original position to avoid blocking the aisle or other passageway. Should both (or all) of the seats be so pivotably and slidably connected, various other uses of the seat would be realized, particularly as a fold down bed. The seat may further include other adjustable features for the seat, arm rests, and reclining back support, if desired.

Accordingly, it is an object of this invention to provide for a novel and improved dual seat frame and seat.

Another object of this invention is to provide for a dual seat frame which may be reclined between seat and bed positions.

Still another object of this invention is to provide for a dual seat frame which is easily adjusted and locked into various positions and is economical to produce and maintain.

Other objects of this invention will become apparent upon a reading of the following description.

BRIEF DESCRIPTION OF THE DRAWINGS

FIG. 5 is a fragmentary sectional view taken along line 5—5 of FIG. 4.

FIG. 6 is a fragmentary cross-sectional view taken along line 6—6 of FIG. 5.

FIG. 7 is a fragmentary cross-sectional view taken along line 7—7 of FIG. 3.

FIG. 9 is a perspective view of the seat of FIG. 2 with the one seat frame slid laterally prior to rotation.

DESCRIPTION OF THE PREFERRED EMBODIMENT

Figure 1:
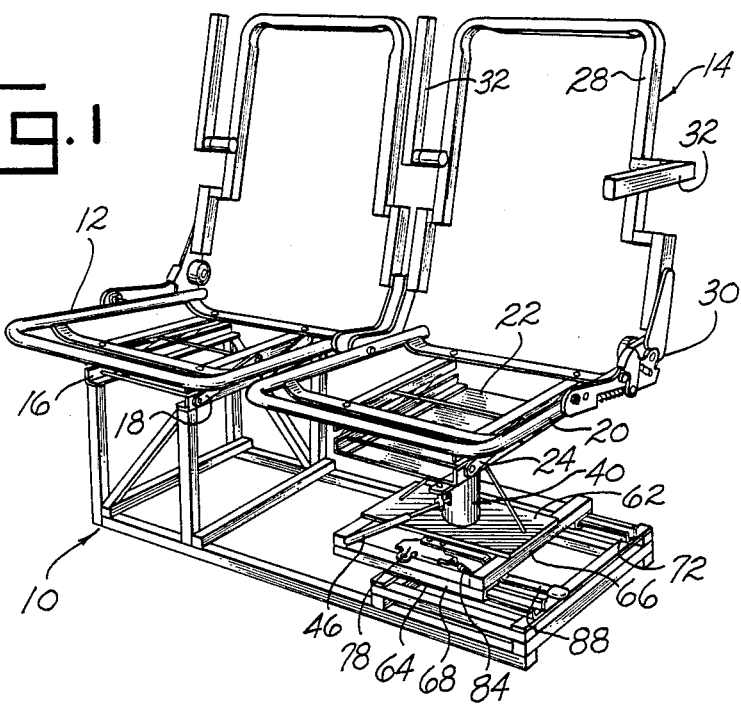
FIG. 1 is a perspective view of the dual seat frame of this invention.

The preferred embodiment herein described is not intended to be exhaustive or to limit the invention to the precise form disclosed. It is chosen and described to explain the principles of the invention and its application and practical use to thereby enable others skilled in the art to utilize the invention.

Referring now to the drawings, reference numeral 10 refers generally to the dual seat frame of this invention, which includes individual seat frames 12 and 14. Seat frame 12 is of conventional construction and is attached to a base 16 as by pivotable links 18.

Figure 2:
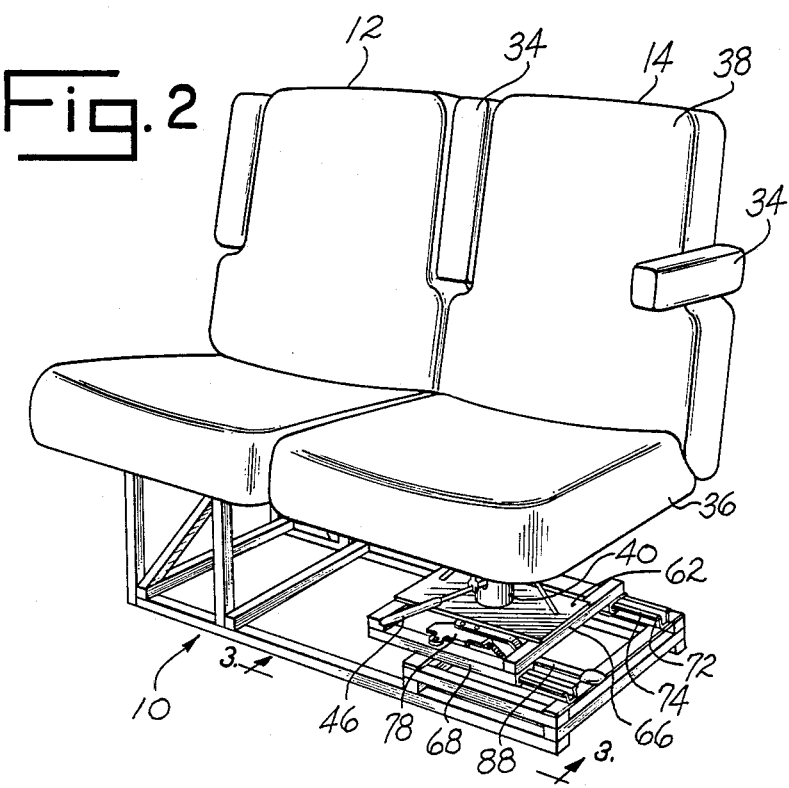
FIG. 2 is a perspective view of the dual seat frame with the seat, back, and arm cushions attached.
Figure 3:
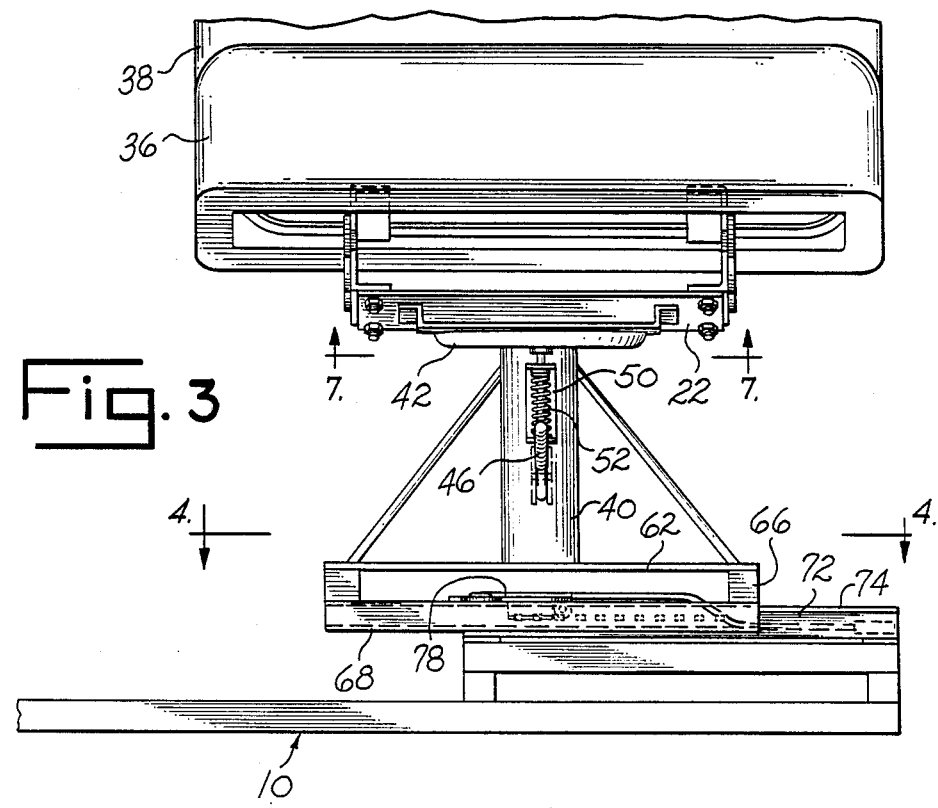
FIG. 3 is a fragmentary front end view of the seat frame as seen from line 3—3 of FIG. 2.
Figure 4:
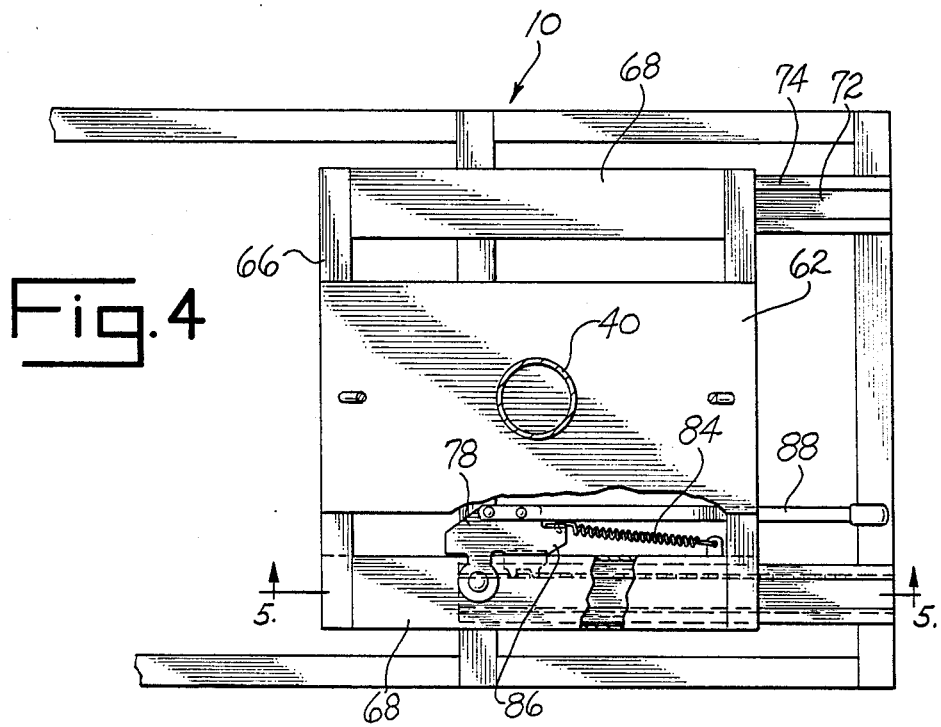
FIG. 4 is a cross-sectional view taken along line 4—4 of FIG. 3 with portions broken away for illustrative purposes.

Seat frame 14 includes a generally horizontal seat support 20 which is connected to a swivel type pedestal top plate 22 by pivotable links 24 and 26. A releasably locking clamp (not shown) may be connected between one or both links 24, 26 and frame 14 to prevent accidental forward tilting of seat frame 14. A releasible locking clamp (not shown) may be connected between one or both links 24, 26 and frame 14 to prevent accidental forward tilting of seat frame 14. Seat frame 14 also includes a generally vertical back support 28 connected to seat support 20 by a conventional spring biased hinge 30 which allows the back support to be pivoted between the upright position shown and a multiplicity of reclining positions. Arm supports 32 are pivotably attached to back support 28 and carry arm cushions 34 (FIG. 2). Seat support 20 and back support 28 carry a seat cushion 36 and back cushion 38, respectively.

Figure 8:
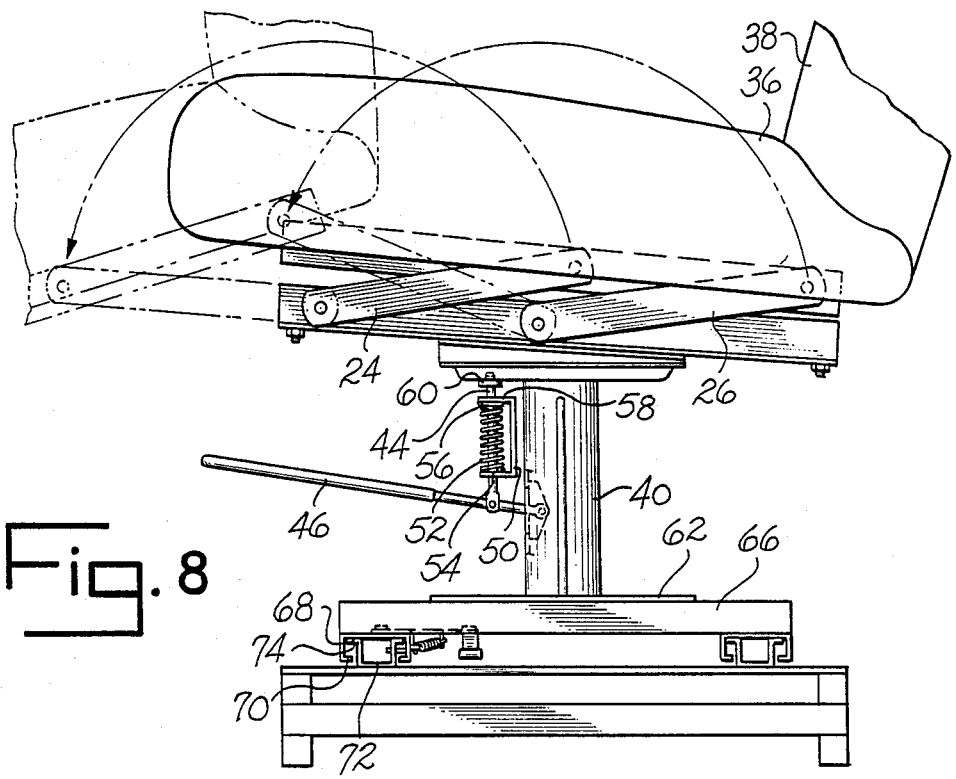
FIG. 8 is a fragmentary side elevational view of the seat frame illustrating the action of the hinged links of the seat support.

Pedestal top plate 22 is supported rotatably atop a support tube 40 as by a conventional lazy-susan bearing (not shown) or similar device carried in basin shaped housing 42 which allows the top plate and the connected seat frame 14 to rotate relative to the support tube. Housing 42 is fixedly connected to top plate 22 and has two or more bores 45 (FIG. 7) spaced at approximately equiradial points about the housing. A lock pin 44 is connected to lever arm 46 as shown in FIG. 8. Lever arm 46 is pivotally connected to support tube 40 for up and down movement. Lock pin 44 extends through U-shaped bracket 50 and helical spring 52 circumscribes the lock pin while bearing on one of the opposite legs 54 of bracket 50 and on a disc 56 fixedly secured to lock pin 44 and bearing on the other bracket leg 58. Lock pin 44 further includes a stop 60 fixedly connected to the lock pin above bracket leg 58.

Support tube 40 is connected to a base plate 62 as by welding. Base plate 62 is connected to a movable frame 64 which is preferably square or rectangular in shape and includes interconnected longitudinal frame members 66 and transverse frame members 68. Transverse frame members 68 are preferably of the inverted U-shape shown and include lower opposed inturned lips 70. Generally U-shaped channel parts 72 include upper outturned lips 74 and are fixedly secured to a base frame 76 as shown. Channel members 72 have spaced holes 75 defined therein. Transverse frame members 68 are slidably fitted along channel parts 72 to allow sideways sliding of seat frame 14 relative to seat frame 12.

A lock member 78 is pivotally connected to one of transverse frame members 68 and includes a depending tab 80 which has one or more projections 82 (two shown). Projections 82 correspond with channel member holes 75 to normally lock seat frame 14 against sliding movement under the influence of spring 84 connected between lock member 78 and a flange 86 of transverse frame member 68 (FIG. 8). A manually operable arm 88 is connected to lock member 78 to allow manual unlocking preparatory to sliding of seat frame 14.

Figure 10:
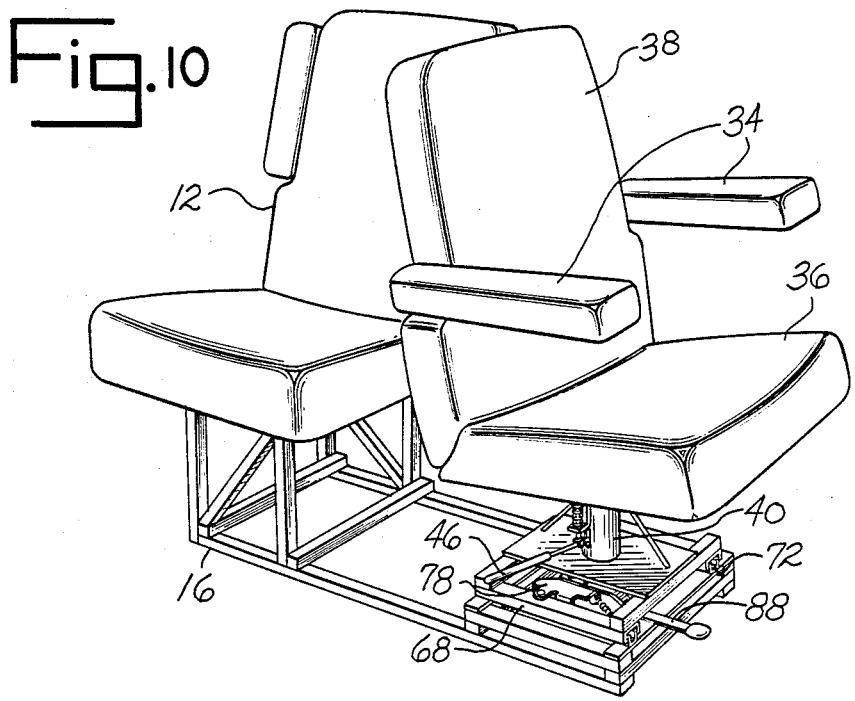
FIG. 10 is a perspective view of the seat with the one seat frame rotated 90°.

The following is a description of the operation of dual seat frame 10. While the drawings and disclosure deal only with the concept of seat frame 14 sliding and rotating relative to seat frame 12, the possibility of dual rotatable seat frames constructed according to the principles of seat frame 14 above should be well within the grasp of one skilled in the art after reading this specification. To pivot seat frame 14 from the normal position shown in FIG. 2 to the 90° shifted position of FIG. 10, a user must first slide seat frame 14 away from seat frame 12 to allow room for cushions 34, 36, and 38 to manuever without obstruction from like cushions carried by seat frame 12.

Lock arm 88 is grasped and shifted horizontally towards back support 28 to withdraw projections 82 from within holes 75. Seat frame 14 is then slid into the position shown in FIG. 8 spaced from seat frame 12 and arm 88 is released to lock the seat frame 14 in place. The user then pushes down on lever arm 46 to withdraw lock pin 44 from within bores 45. Seat 14 is then rotated about its bearing arrangement (not shown) into the position of FIG. 10 or other desired position. Lever arm 46 is then released, whereupon tension from spring 52 bears on disc 56 to urge lock pin 44 back into locking engagement within a housing bore 45. Stop 60 prevents the user from overextending lever arm 46. Due too the biasing influence of springs 52 and 84, if seat frame 14 is not securely locked in position, a user need only to rotate and/or slide seat frame 14 until lock pin 44 and/or projections 82 enter holes 45 or 75 to lock the seat frame in position. To return seat frame 14 to the position of FIG. 2, the above procedure is reversed.

It is understood that the above description does not limit the invention to those exact details, but may be modified within the scope of the appended claims.

We claim:

1. A swivel seat comprising a base frame, first and second seat frames each including a seat support and a back support, each seat frame individually connected to said base frame and having a first position normally facing in the same direction, means connecting said first seat frame relative to said second seat frame, and means connected to said first seat frame and base for allowing rotative movement of the first seat frame relative to the second seat frame between said first position and a plurality of positions facing in different directions than said second seat frame and articulated means connecting said first seat support to said base frame for pivotal adjustment of said first seat support in a direction 90° spaced from the lateral between an aligned position corresponding to said second seat support and a skewed position forward of said second seat support.

2. The swivel seat of claim 1 wherein each first and second seat support is connected to said back support by a hinge, said hinge constituting means for pivotally adjusting said back support relative to said seat support.

3. The swivel seat of claim 1 wherein said sliding means includes spaced channel parts connected to said base frame, and cooperating interlocking slide parts attached to said first seat frame and slidably connected to said channel parts, said sliding means further including means for selectively locking and unlocking said first seat frame against sliding movement along said channel parts.

4. The swivel seat of claim 3 wherein said rotative means includes an upright support extending upwardly from and fixed to said base frame, said upright support including an upper support flange defining holes therethrough, said first seat frame seat support including a plate seated rotatively atop said support flange, and including pin means for seating in said flange holes to selectively lock said first seat frame against rotative movement.

5. The swivel seat of claim 3 wherein said locking means includes a lock member rotatably connected to said first seat frame, one of said channel parts defining a plurality of bores, said lock member including finger projections rotatable between a locked position in said channel part bores, and an unlocked position spaced from said channel part bores, said locking means further including manually operable arm means extending outwardly of said base frame for shifting said lock member between its said locked and unlocked position.

6. The swivel seat of claim 5 and spring means connected between said lock member and said base frame for normally urging the lock member into its said locked position.

7. The swivel seat of claim 1 wherein said second seat frame is also rotatably and slidably connected to said base frame in the same fashion as said first seat frame.

* * * * *